(12) United States Patent
Pepin et al.

(10) Patent No.: US 8,191,164 B2
(45) Date of Patent: May 29, 2012

(54) METHOD FOR MANAGING ACCESS RIGHTS IN A SMART CARD

(75) Inventors: Cyrille Pepin, Andresy (FR); Guillaume Roudiere, Boulogne (FR)

(73) Assignee: Morpho, Paris (FR)

( * ) Notice: Subject to any disclaimer, the term of this patent is extended or adjusted under 35 U.S.C. 154(b) by 250 days.

(21) Appl. No.: 12/739,455

(22) PCT Filed: Oct. 29, 2008

(86) PCT No.: PCT/FR2008/001521
§ 371 (c)(1),
(2), (4) Date: Apr. 23, 2010

(87) PCT Pub. No.: WO2009/090350
PCT Pub. Date: Jul. 23, 2009

(65) Prior Publication Data
US 2010/0313277 A1    Dec. 9, 2010

(30) Foreign Application Priority Data
Oct. 31, 2007   (FR) ...................................... 07 07657

(51) Int. Cl.
*G06F 7/04*   (2006.01)
*G06F 21/00*  (2006.01)
*H04N 7/16*   (2006.01)

(52) U.S. Cl. .................. 726/30; 726/2; 726/20; 726/27; 713/182; 713/184; 725/6

(58) Field of Classification Search ................ 726/2, 20, 726/27, 30; 713/182, 184; 725/6
See application file for complete search history.

(56) References Cited

U.S. PATENT DOCUMENTS
6,779,113 B1   8/2004 Guthery

FOREIGN PATENT DOCUMENTS
EP       1 431 862 A   6/2004

*Primary Examiner* — Mohammad Reza
(74) *Attorney, Agent, or Firm* — Muncy, Geissler, Olds & Lowe, PLLC

(57) ABSTRACT

A method of managing access rights in a smart card, to subordinating execution of a command ($Cmd_1$, $Cmd_k$) such as reading or writing to an event ($Evt_1'$, $Evt_k'$) being valid, such as authentication by verifying a code. The state of validation events is stored in a register, and the access rights are stored in a command list (List_Cmd) made up of couples ($Cpl_1$, $Cpl_k$), each associating a command with an event. On receiving a request to execute a command, a search is made in the command list (List_Cmd) for the couple ($Cpl_1$, $Cpl_k$) that includes the requested command, and execution is refused if the search is unsuccessful. If the search is successful, then it is determined from the register (referred to as the card security state register) whether the event associated with the command is or is not valid, in order to authorize or refuse execution thereof. The invention is for use in any smart card application that involves access rights.

9 Claims, 1 Drawing Sheet

METHOD FOR MANAGING ACCESS RIGHTS IN A SMART CARD

The invention relates to managing access rights to data stored in a smart card.

BACKGROUND OF THE INVENTION

A smart card typically contains rewritable read-only memory (ROM) of the Flash or electrically erasable programmable ROM (EEPROM) type, a processor or microcontroller, and volatile memory known as read-only memory (RAM).

Access rights ensure the confidentiality of data contained in the card, where such confidentiality is essential in multiple applications, such as for example bank cards, or the subscriber identity module (SIM) cards used in mobile telephones.

When the card is engaged in an appliance, execution of commands such as reading or writing data is possible only providing special conditions are satisfied.

By way of example, these conditions may be prior authorization by verifying a code, or indeed setting up a secure channel between the card reader and the terminal from which the commands are issued.

Access rights that enable it to be determined whether the required conditions are satisfied for executing a command are themselves managed by a rights evaluation program referred to as a "mask", which program is pre-stored in the memory of the card and is executed by its processor.

When a request is received to execute a command such as reading a data set, the rights evaluation program begins by identifying the access rights that are associated with the data.

These rights are stored in the card and they define the conditions that are required in order to execute each command on the target data: for example, authentication by verification of a code is necessary for executing a read command.

The program then determines whether the conditions in question are satisfied by consulting a register referred to as the card security state register, which register is stored in the card and contains an updated list of previously validated events.

By way of example, these events may be authentication by verifying a code, successfully establishing a secure communications channel between the card and the terminal with which it is interacting, or some other event, each event being in a so-called "valid" state if the event has been accomplished successfully.

In practice, it is found that known programs and architectures for managing access rights do not give entire satisfaction.

This is due to the fact that the general structure of access rights is complex since each data set stored in the card, e.g. each file, possesses its own access rights.

Furthermore, for a given file, these rights define conditions that are not the same from one command to another.

Furthermore, for a given command to be executed on a given file, conditions may differ depending on whether the card is communicating with a terminal via an electrical contact, or via a wireless connection.

Reading a file may require authorization, while writing to the file may also require a secure channel to be set up, and deleting the file may require separate authentication using another code that is different from the first.

For another file, reading, writing, and deleting may be performed without it being necessary to satisfy any condition.

Thus, each file possesses its own rights, and the access rights system may also be complex in itself since it may involve a multitude of conditions such as a plurality of authentication levels using different codes, setting up secure channels, etc.

Furthermore, it is possible for these conditions to be combined: for example, the right to write data in a file may be granted providing: a first level of authentication has been performed and a secure channel has been set up, or else if a second level of authentication has been performed successfully.

Thus, access rights occupy a large amount of memory space in the card, even though the memory capacity of a smart card is itself restricted. Furthermore, the time required to execute the program for evaluating rights is penalized by the fact that multiple reads need to be performed to determine whether or not a command may be executed on a given file.

Several standards, such as the ISO 7816-4 or ISO 7816-9 standards, describe mechanisms for managing access rights, but they all present shortcomings: they are not very open, and they give rise to rights evaluation times that are too long.

OBJECT OF THE INVENTION

The object of the invention is to propose an architecture for managing access rights that enables the above-mentioned drawbacks to be remedied by offering compact data storage, high execution speed for the rights management program, and sufficient operating security.

SUMMARY OF THE INVENTION

To this end, the invention provides a method of managing access rights associated with smart card data so as to subordinate execution of a command such as a command to read said data, to a logical combination of a plurality of events detected by the card being valid, such as authentication by verifying a code;

wherein the validation state of each event is kept up to date in a security state register of the card;

wherein the access rights to a data set are stored in a command list that is associated with an event list that gives, for each event it includes, an identifier for that event;

the command list being made up of couples, each associating a command with a logical combination of events that must be valid, which combination is defined by the rank in the event list of each of the events making up said combination;

wherein on receiving a request to execute a command on a data set, the authorization or refusal to execute said command is established:

by searching in the command list associated with said data for the couple including the requested command, and refusing execution if the search is unsuccessful; and if the search is successful, by determining from a security state register of the card whether the combination of events associated with the command is or is not valid in order to authorize or refuse execution of the command.

The invention also provides a method as defined above, wherein each command stored in the command list is coded in the form of a binary word representative of an identifier of the command. It should be observed that all possible commands need not necessarily be listed in the command list.

The invention also provides a method as defined above, wherein the event list also includes one or more event combinations, each combination being defined therein by the rank in the event list of each of the events making up said combination, said list being ordered in such a manner that each logical combination of events is situated after the events that make it up.

The invention also provides a method as defined above, wherein the event list begins by a binary word representative of the number of events and combinations of events contained in said list, with it being possible for said list to be empty.

The invention also provides a method as defined above, wherein each event or event combination stored in a list is coded in the form of a binary word beginning with a first binary flag indicating whether it relates to an event or a logical combination of events.

The invention also provides a method as defined above, wherein each binary word corresponding to an event includes the identifier of said event coded at the end of the word.

The invention also provides a method as defined above, wherein each word corresponding to a logical combination of events comprises a series of binary flags situated at the end of the word, in which each binary flag of value "ONE" indicates that the event having, in the event list, the same rank as said flag in the series forms part of said logical combination of events.

The invention also provides a method as defined above, wherein the second binary flag of each word corresponding to a logical combination of events indicates whether it relates to a conjunctive or to a disjunctive logical combination.

The invention also provides a smart card including means for implementing the above method.

DETAILED DESCRIPTION OF THE INVENTION

The invention applies in particular to a smart card including storage means, such as a volatile memory and a non-volatile memory together with a processor, and a program for managing access rights to files or data sets stored in the card.

The idea on which the invention is based is to define an access right recording format that is suitable for being modulated as a function of need, in association with an algorithm that is capable of ensuring that access rights are evaluated fast.

A command to be executed on a data set, or file, is generally subordinate to prior validation of an event or a combination of events, i.e. validation of an event that may either be simple or else composite. Thus, below, events as such are referred to as simple events, while combinations of events are referred to as composite events.

By way of example, validating a simple event may corresponding to verifying a code PIN1 or PIN2 or a password, or indeed to a secure communications channel being established.

A composite event corresponds to a plurality of simple events that are logically combined by "AND" or "OR" operators, i.e. conjunction or disjunction, and it may also be defined as a logical combination of a plurality of composite events reduced to a combination of simple events.

The events are numbered and managed as numerical values or identifiers, and the security state of the card, written {$Evt_a$, $Evt_b$, ..., $Evt_x$} is the list of validated events at any given instant, which list is stored and kept up to date in a memory register of the smart card.

Figure 1:
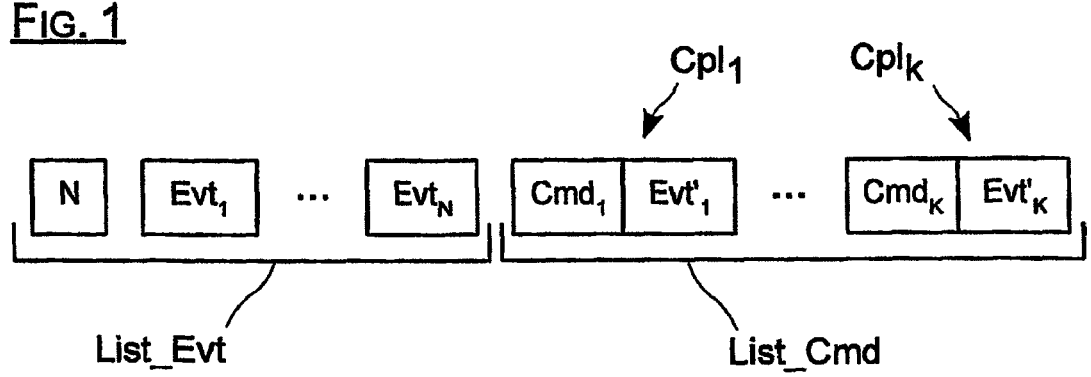
FIG. 1 is a diagram of a list of events and a list of commands associated with a data set in the method of the invention.

If the access rights system makes use only of simple events, then the access rights storage format mainly comprises a respective command list, written List_Cmd and shown diagrammatically in FIG. 1, that is associated with each data set or file.

It comprises a list of couples or pairs, written $Cpl_1$, ..., $Cpl_k$, each comprising a command and an event, it not being necessary for all of the existing commands to be present in the list.

In the example of FIG. 1, the couple $Cpl_1$ associates the command $Cmd_1$ with the event $Evt_1'$, and the couple $Cpl_k$ associates the command $Cmd_k$ with the event $Evt_k'$.

Each event $Evt_1'$, ..., $Evt_k'$ is represented in the command list by its numerical identifier, thus making it possible, for example, to determine its state merely by reading the security state register of the card.

On receiving a request to execute a command, written C, on a data set, authorization or refusal to execute said command is decided by searching for the command C in the command list List_Cmd relating to the target data set.

If the search is unsuccessful, then the command C is not executed. If the search is successful, the command is executed if the event associated with the command C in the list List_Cmd is validated in the security state register, otherwise it is not executed.

If the access rights system makes use of composite events, then the command list List_Cmd has an event list added thereto, which list is represented diagrammatically in FIG. 1 and is referenced List_Evt.

This event list is used together with the command list to define composite events:

The event list has simple events identified by their identifiers, and each composite event is defined in the command list by the ranks in the event list of the events that make it up.

The event list may also include composite events, thus making it possible to define complex logical combinations, i.e. involving the "OR" and "AND" operators. Each composite event in the event list is then defined by the ranks in said event list of the simple or composite events that make it up.

Thus, under all circumstances, each simple event involved in defining a composite event necessarily appears in the event list.

If the rights system also involves simple events that condition on their own the execution of a command, then these simple events appear in the command list in a manner analogous to the situation in which the rights system involves only simple events.

Simple events and composite events are coded by binary words, respectively Wd_Evt_Spl and Wd_Evt_Cps, that are of different structures.

Figure 2:
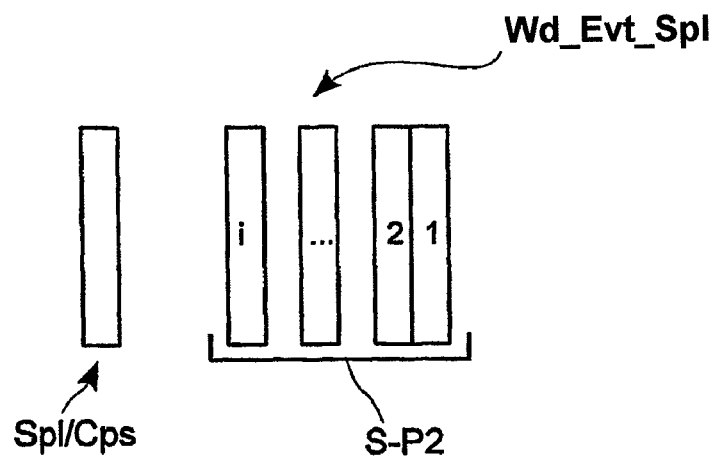
FIG. 2 is a diagram of a word representative of a simple event in the method of the invention.

The structure of a binary word Wd_Evt_Spl corresponding to a simple event is shown diagrammatically in FIG. 2. This binary word, i.e. this set of binary flags or bits, comprises first bit written Spl/Cps followed by a series of bits written S-P2.

The first bit Spl/Cps, which is a marker indicating whether the event is simple or composite, is set to a value that is representative of a simple event. It is unnecessary if only simple events are managed.

The series of bits S-P2 is the encoding in powers of two of the event identifier serving, for example, to determine its validation state by reading the security state register of the card.

If the series S-P2 comprises four bits, then 16 simple events are possible: the simple event having the numerical value "3" as its identifier, written $Evt_3$, is then encoded in the form [0-0

0 1 1], and the simple event having the value "6" as its identifier, written $Evt_6$, is then coded in the form [0-0 1 1 0].

Figure 3:
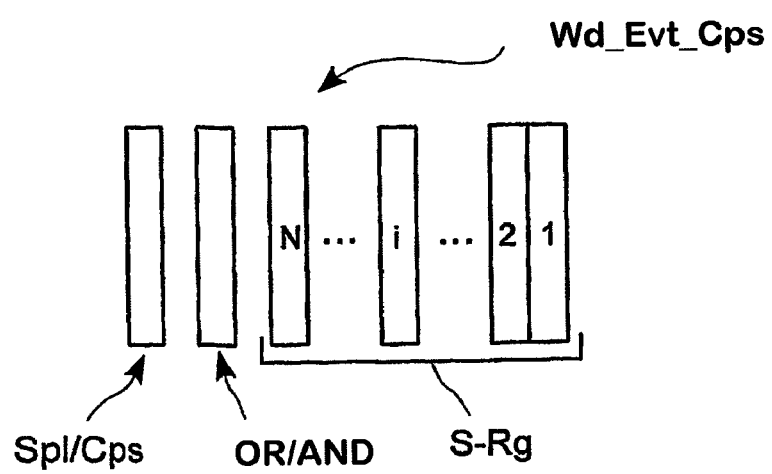
FIG. 3 is a diagram of a word representative of a composite event in the method of the invention.

The structure of a binary word Wd_Evt_Cps defining a composite event is shown diagrammatically in FIG. 3. This binary word comprises a first bit written Spl/Cps followed by a second bit written OR/AND, itself followed by a series of bits written S-Rg.

The Spl/Cps bit is a marker indicating whether the event is simple or composite and it is given a value that is representative of a composite event. The second bit written OR/AND is a marker indicating whether the composite event is the disjunction or the conjunction of a plurality of events.

The series of bits S-Rg defines the event constituting the composite event, which events are coded by rank and not by powers of two: in this series, the rank of each bit having the value 1 refers to the event having the same rank in the event list List_Evt.

This technique of coding by rank makes it possible to reduce significantly the length of the word Wd_Evt_Cps: a composite event may be constituted by a number of events corresponding merely to the length of the series S-Rg.

Thus, for an event list of size 6, i.e. if N is equal to 6, then the composite event "$Evt_1$ OR $Evt_2$ OR $Evt_3$" is coded by the binary word [1-0-0 0 0 1 1 1].

In the above word, the first bit, Spl/Cps, is at 1 to specify that the event is composite, the second bit OR/AND is at 0, meaning that the combination is an "OR" logic combination, and the following three bits are at 1 to indicate that it is the combination of the events having ranks 1, 2, and 3 in the event List List_Evt.

In analogous manner, the composite event "$Evt_4$ AND $Evt_5$" is coded by the word [1-1-0 1 1 0 0 0].

Each composite event is the conjunction or disjunction of a plurality of events in the event list List_Evt, such that a composite event may be constituted by events that are themselves composite. This makes it possible to establish logical combinations that are complex, i.e. that involve both conjunction and disjunction.

In this context, the following example illustrates the coding for the composite event "($Evt_1$ OR $Evt_2$) AND $Evt_3$":

The event list is then encoded on 34 bits:

| | | |
|---|---|---|
| [N = 5] | [101] | 3 bits |
| [Evt1] | [0-0001] | 5 bits |
| [Evt2] | [0-0010] | 5 bits |
| [Evt3] | [0-0011] | 5 bits |
| [Evt4 = Evt1 OR Evt2] | [1-0-000011] | 8 bits |
| [Evt4 AND Evt3] | [1-1-001100] | 8 bits |

As when managing simple events, the management of access rights in a system using composite events is performed by reference to the security state register of the card.

On receiving a request to execute a command C on a data set, authorization or refusal to execute the command is decided by searching for the command C in the command list List_Cmd relating to the target data set. If the search is unsuccessful, then the command C is not executed.

If the search is successful, then the command is executed when the event associated with the command C in the list List_Cmd is valid.

If the event is a simple event, it is determined whether the event is or is not valid for the purpose of authorizing or refusing execution of the command by reading the security state register of the card.

If the event is a composite event, the logical combination defining it is identified from the event list List_Evt referred to by the command list List_Cmd. Thereafter, it is determined whether the logic combination is or is not satisfied for authorizing or refusing execution of the command by reading the security state register of the card.

The storage format of access rights is thus capable of being modulated as a function of needs, since the size and the presence of each element may be defined to be as small as possible for each utilization circumstance, i.e. for each smart card application.

The parameters that can be varied are the maximum number of existing commands, written $N_{CMD}$; the maximum number of possible events, written $N_{EVT}$; and the maximum number of events that might appear in the event list, written $N_{DAC}$.

In order to manage rights that are very simple, involving only the READ and WRITE commands, and involving only the following simple events: "always", written [ALL]; "never", written [NEV]; "verify PIN code", written [PIN]; and "set up a secure channel", written [SM], the system may be set with the following parameter values:

$N_{CMD}$=2: the commands are thus encoded on a single bit: [READ]=0 and [WRITE]=1.

$N_{DAC}$=0: since only simple events are involved, the list List_Evt and the bit Spl/Cps are not needed.

$N_{EVT}$=4: the simple events are coded on a series S-P2 comprising two bits: [ALL]=0 0; [PIN]=0 1; [SM]=1 0; [NEV]=1 1.

For an access right corresponding to reading authorized at all times, and writing authorized only when the PIN code is verified, the coding may be performed on only six bits, as shown below:

| | | |
|---|---|---|
| [READ] | [0] | 1 bit |
| [ALL] | [00] | 2 bits |
| [WRITE] | [1] | 1 bit |
| [PIN] | [01] | 2 bits |

At the other extreme, for a system that is very open, it is possible to use the following values:

$N_{CMD}$=64: the commands are then coded on six bits.

$N_{EVT}$=128: the simple events are coded on eight bits including the bit Spl/Cps and seven bits corresponding to the series S-P2 dedicated to their identifiers that are coded as powers of two.

$N_{DAC}$=8: the composite events are coded on ten bits comprising the bit Spl/Cps, the bit OR/AND, and eight bits corresponding to the series S-Rg.

Each composite event may thus be a combination of one to eight events taken from the eight first events in the list List_Evt.

Thus, each element of the command list, i.e. each couple representing a command and the event associated therewith is then coded on 14 bits for a simple event and on 16 bits for a composite event.

With these parameters, the following example describes the access rights for the following conditions: reading is authorized if the code PIN1 has been verified; writing is authorized providing the code PIN2 has been verified AND a secure channel has been established; deleting is authorized if the code PIN3 has been verified OR if a secure channel has been set up:

| | | |
|---|---|---|
| [N = 4] | [0100] | 4 bits |
| [SM] | [0-0001111] | 8 bits |

-continued

| | | |
|---|---|---|
| [PIN2] | [0-0000010] | 8 bits |
| [PIN3] | [0-0000011] | 8 bits |
| [READ] | [000001] | 6 bits |
| [PIN1] | [0-0000001] | 8 bits |
| [WRITE] | [000010] | 6 bits |
| [PIN2 AND SM] | [1-1-00000011] | 10 bits |
| [DELETE] | [000011] | 6 bits |
| [PIN3 OR SM] | [1-0-00000101] | 10 bits |

Thus, the set of access rights relating to said data or said file is coded on only 74 bits.

The algorithm implemented by the program for evaluating access rights returns the value "TRUE" if the necessary conditions are satisfied for accessing the file, otherwise it returns the value "FALSE".

In order to determine whether access should be authorized or refused, the program begins by identifying the requested command, written C, and the security state of the card, written $\{Evt_a, Evt_b, \ldots, Evt_x\}$.

Initially, if an event list is present, i.e. if $N_{DAC}$ is not 0, the program identifies the simple events that appear in the list List_Evt, which events are also present in the security state of the card $\{Evt_a, Evt_b, \ldots, Evt_x\}$.

In other words, it determines which simple events in the access rights list are actually validated by the security state of the card, and it stores this state.

Thereafter, for each composite event present in the event list, if there is one, the program verifies whether it is valid or not valid as a function of the above-stored event list, and it also stores this state.

The event list is ordered as follows: simple events first, possibly followed by composite events arranged in such a manner that the events to which they refer precede them in the list. By using this order, the access right can be evaluated in a single pass, without recursion.

The program then searches for the command C in the command list, and if the command C is absent from said list, it returns the value "FALSE", because by convention the absence of the looked-for command corresponds to the condition "never".

When the command C is present in the list, the program evaluates the validity of the event associated therewith, which is the event appearing in the couple that contains the command C.

If the event is a simple event, its validity state may be determined by reading directly in the security state of the card. If the event is a composite event, its validity state is determined from the state stored at the end of the first step.

The program then returns the value "TRUE" or "FALSE" depending on whether the event associated with the command is valid or not valid.

To optimize searching for the command, it is possible to act on the parameters $N_{CMD}$, $N_{EVT}$, $N_{DAC}$ so that all of the events are stored on complete 8-bit bytes. It is also possible to require simple events and composite events to have the same size.

The invention claimed is:

1. A method of managing access rights associated with smart card data so as to subordinate execution of a command ($Cmd_1, \ldots, Cmd_k$) such as a command to read said data, to a logical combination of a plurality of events ($Evt_1', \ldots, Evt_k'$) detected by the card being valid, such as authentication by verifying a code;

wherein the validation state of each event ($Evt_1, \ldots, Evt_N$) is kept up to date in a security state register of the card ($\{Evt_a, Evt_b, \ldots, Evt_x\}$);

wherein the access rights to a data set are stored in a command list (List_Cmd) that is associated with an event list (List_Evt) that gives, for each event it includes, an identifier for that event;

the command list being made up of couples ($Cpl_1, \ldots, Cpl_k$), each associating a command ($Cmd_1, \ldots, Cmd_k$) with a logical combination of events that must be valid, which combination is defined by the rank in the event list (List_Evt) of each of the events making up said combination;

wherein on receiving a request to execute a command (C) on a data set, the authorization or refusal to execute said command is established:

by searching in the command list (List_Cmd) associated with said data for the couple ($Cpl_1, \ldots, Cpl_k$) including the requested command (C), and refusing execution if the search is unsuccessful; and if the search is successful, by determining from a security state register of the card whether the combination of events ($Evt_1', \ldots, Evt_k'$) associated with the command (C) is or is not valid in order to authorize or refuse execution of the command (C).

2. The method according to claim 1, wherein each command ($Cmd_1, \ldots, Cmd_k$) stored in the command list (List_Cmd) is coded in the form of a binary word representative of an identifier of the command ($Cmd_1, \ldots, Cmd_k$).

3. The method according to claim 1, wherein the event list (List_Evt) also includes one or more event combinations, each combination being defined therein by the rank in the event list (List_Evt) of each of the events making up said combination, said list being ordered in such a manner that each logical combination of events is situated after the events that make it up.

4. The method according to claim 1, wherein the event list (List_Evt) begins by a binary word representative of the number ($N_{DAC}$) of events and combinations of events contained in said list.

5. The method according to claim 1, wherein each event or event combination ($Evt_1, \ldots, Evt_k$) stored in a list is coded in the form of a binary word beginning with a first binary flag (Spl/Cps) indicating whether it relates to an event or a logical combination of events.

6. The method according to claim 5, wherein each binary word corresponding to an event (Wd_Evt_Spl) includes the identifier of said event coded at the end of the word (S-P2).

7. The method according to claim 5, wherein each word corresponding to a logical combination of events (Wd_Evt_Cps) comprises a series of binary flags situated at the end of the word (S-Rg), in which each binary flag of value "ONE" indicates that the event having, in the event list (List_Evt), the same rank as said flag in the series (S-Rg) forms part of said logical combination of events.

8. The method according to claim 5, wherein the second binary flag (OR/AND) of each word corresponding to a logical combination of events (Wd_Evt_Cps) indicates whether it relates to a conjunctive or to a disjunctive logical combination.

9. The smart card including means for implementing the method according to claim 1.

* * * * *